United States Patent [19]

Bacskai

[11] 4,145,519
[45] Mar. 20, 1979

[54] CATALYST FOR THE POLYMERIZATION OF 2-PYRROLIDONE FROM ALKALI METAL

[75] Inventor: Robert Bacskai, Kensington, Calif.

[73] Assignee: Chevron Research Company, San Francisco, Calif.

[21] Appl. No.: 794,445

[22] Filed: May 6, 1977

Related U.S. Application Data

[63] Continuation of Ser. No. 607,844, Aug. 25, 1975, abandoned.

[51] Int. Cl.$^2$ ............................................. C08G 69/24
[52] U.S. Cl. .............................. 528/312; 252/431 C; 252/431 N; 260/326.5 FL; 260/326.5 FN; 528/313; 528/326
[58] Field of Search .......... 260/78 P, 78 L, 326.5 FL, 260/326.5 FN; 252/431 C, 431 N; 528/312, 326, 313

[56] References Cited

U.S. PATENT DOCUMENTS

| | | | |
|---|---|---|---|
| 2,854,458 | 9/1958 | Reppe et al. | 260/239.3 R |
| 3,346,566 | 10/1967 | Chiddix et al. | 260/239.3 R |
| 3,700,656 | 10/1972 | Masaki et al. | 260/239.3 A |
| 3,842,047 | 10/1974 | Pusztaszeri | 260/78 P |
| 3,865,814 | 2/1975 | Lussi et al. | 260/239.3 R |

*Primary Examiner*—Harold D. Anderson
*Attorney, Agent, or Firm*—Dix A. Newell; T. G. DeJonghe; Lawrence S. Squires

[57] ABSTRACT

The process of making catalyst for the alkaline catalyzed polymerization of 2-pyrrolidone, in which an alkali metal is contacted with a 5–7 membered-ring lactam and the product alkali metal lactamate is obtained by distillation in the residuum containing about 50–95% of the total lactam. The alkali metal lactamate so obtained is used as a catalyst in the polymerization of 2-pyrrolidone, or may be contacted with carbon dioxide to form an adduct which finds use as an activator in the polymerization of 2-pyrrolidone.

7 Claims, No Drawings

CATALYST FOR THE POLYMERIZATION OF 2-PYRROLIDONE FROM ALKALI METAL

This application is a continuation of application Serial No. 607,844 now abandoned.

BACKGROUND OF THE INVENTION

The conventional polymerization of 2-pyrrolidone is performed in the presence of a catalyst system composed of an alkaline catalyst and a small amount of polymerization initiator, or activator. At first it was suggested that the alkaline catalyst be obtained by the reaction of an alkali metal and a lactam (see U.S. Pat. Nos. 2,638,463 and 2,809,958). For example, the reaction between potassium and 2-pyrrolidone proceeds according to the following equation:

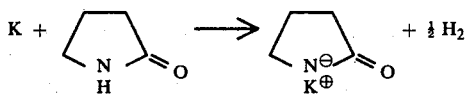

The reaction is observed to generate hydrogen gas. The analogous reaction occurs between other alkali metals and 2-pyrrolidone. The process has been carried out in the prior art by slowly adding less than an equivalent amount of the metal to the lactam (i.e., in excess lactam) to produce a solution of alkali metal lactamate in the lactam.

However, the more recent prior art teaches repeatedly that an alkali metal in metallic form should not be used as the source of the alkaline catalyst system (U.S. Pat. Nos. 3,721,652, 3,683,046, 3,682,689, 3,681,296, 3,681,295, 3,681,293 and 3,346,566) because it gives a catalyst system which is deleterious to the polymerization reaction. On the other hand, the same prior art teaches that alkali metal derivatives, such as the hydroxides, are suitable sources of alkaline polymerization catalysts. For example, the use of a sodium metal-derived catalyst system has been shown to produce a low yield (3.2%) of low-molecular-weight polymer unsuitable for melt spinning (see U.S. Pat. No. 3,721,652, Experiment C), while potassium hydroxide-derived catalyst systems produce, in good yield, a polymer suitable for melt spinning (ibid., Example 1, etc.). The general unsuitability of the metallic alkali metal for catalyst preparation has been ascribed to reduction of the sensitive 2-pyrrolidone ring by such strong metallic reducing agents (ibid., Col. 3, line 69ff and U.S. Pat. No. 3,346,566, Col. 1, line 23ff). Furthermore, the alkali metal-derived catalysts are said to be difficult, or even impossible, to purify and are said to lose catalytic activity with time (see U.S. Pat. No. 3,835,100, Cols. 1 and 9). My work confirms that a catalyst solution produced from alkali metal (with or without the addition of a polymerization activator or initiator such as carbon dioxide) is generally an unsatisfactory catalyst for the polymerization of 2-pyrrolidone.

SUMMARY OF THE INVENTION

A process for making a catalyst for the alkaline-catalyzed polymerization of 2-pyrrolidone includes the steps of contacting a metallic alkali metal with an excess amount of a 5–7 membered-ring lactam to form a mixture of said lactam and the alkali metal lactamate catalyst and subjecting said mixture to distillation conditions. After distillation, the lactamate is obtained in the residuum, which contains about 50–95% by weight of the total lactam.

DESCRIPTION OF PREFERRED EMBODIMENTS

In embodiments of this invention, metallic alkali metal is contacted with a lactam, preferably 2-pyrrolidone, to form a solution containing alkali metal lactamate. The solution is then distilled, and the lactamate is obtained in the residuum of the distillation. A satisfactorily effective catalyst is thus secured for use with the polymerization activators such as carbon dioxide.

In an embodiment of the process of this invention, a 5–7 membered-ring lactam and less than an equivalent amount of alkali metal are slowly contacted in a reactor. Preferably alkali metal and lactam are contacted in a mol ratio of about 1:2–50. The evolution of hydrogen gas which accompanies their reaction is allowed to subside. Then about 5–50% by weight of the total lactam originally charged is distilled off at pressures ranging from atmospheric to subatmospheric and temperatures ranging from 50° C. to 300° C., preferably under reduced pressure of about 1–10 mm Hg at a temperature of about 90–150° C. The alkali metal lactamate catalyst is obtained as a solute in the residuum of the distillation. The residuum contains about 50–95% by weight of the total lactam. "Total lactam" signifies the total amount of lactam originally charged to the reactor, including that portion converted to alkali metal lactamate.

Preferably the alkali metal is contacted with 2-pyrrolidone in a mol ratio of about 1:2–50 and distillation is carried out under reduced pressure of about 1–10 mm Hg at a pot temperature of about 90°–150° C. until about 5–50% of the pyrollidone is distilled off. The catalyst is then obtained as a solute in the residuum of the distillation. The residuum contains about 50–95% by weight of the total pyrrolidone originally charged to the reactor.

2-pyrrolidone is the preferred choice of lactam for making catalyst by the described process. If 2-pyrrolidone is used, the solution remaining after distillation may be directly subjected to polymerization conditions to produce polypyrrolidone, or the solution may be contacted with monomer to catalyze its polymerization. A small amount of polymerization initator or activator, such as carbon dioxide, is normally added to achieve substantial yields of polypyrrolidone.

The alkali metal which finds use in the production of the alkaline catalyst is any Group IA metal of the Periodic Table, preferably sodium or potassium metal, and most preferably potassium metal.

The polymerization of 2-pyrrolidone is usually carried out in the presence of an activator (initiator) for polymerization. Many types of initiator have been suggested, including acyl derivatives (U.S. Pat. No. 2,739,959); N-acyl lactams (U.S. Pat. No. 2,809,958); oxides of Group VI such as $SO_2$ (U.S. Pat. No. 3,174,951); halides and oxyhalides, halosilanes, $CS_2$, amides, sulfonamides, isocyanates, $NO_2$, carbonyl halides, etc. Of these, the preferred activators are $SO_2$ and $CO_2$ or are derived from $SO_2$ or $CO_2$. While $CO_2$ is most preferred, mixed initiators may also be utilized.

A polymerization activator is normally used in amounts sufficient to effect substantial conversion and reasonable yields of high-viscosity polymer in a reasonable period of time. Up to 0.2 mol of initiator per mol of monomer is used, but normally about 0.02–10 mol percent of initiator, based on total monomer, is preferred, and about 1–5 mol percent is most preferred. When used as co-initiators in combination with $CO_2$, such compounds as N-acyl pyrrolidone, phthalic anhydride, $CS_2$, ethylene carbonate and trifluoromethane sulfonic anhydride, in amounts of about 0.01–0.02 mol percent, based on total monomer, may accelerate the polymerization of 2-pyrrolidone.

The polymerization of 2-pyrrolidone is carried out at a temperature of about 15° C. to about 100° C., preferably 25° C. to 70° C., and most preferably from about 40° C. to about 60° C., under a pressure ranging from subatmospheric to superatmospheric, in the presence of the alkaline polymerization catalyst for a period from about 4 to about 100 hours, or longer, preferably from about 8 to about 72 hours, more preferably from about 8 to about 48 hours. Substantially anhydrous polymerization conditions are preferred.

The total alkaline polymerization catalyst comprises from about 0.5 to 30 mol percent, or higher, of the monomer-catalyst mixture (the polymerizate). The mol percent of catalyst is based on total monomer. For purposes of polymerization, total monomer consists of 2-pyrrolidonate catalyst, 2-pyrrolidone provided as solvent for said catalyst, 2-pyrrolidonate catalyst having formed an adduct with the activator, and any additional monomer charged to the reactor for purposes of polymerization; it does not include lactam removed by distillation during catalyst preparation according to the present invention. Preferably about 5–20 mol percent total alkaline polymerization catalyst, and most preferably about 10 mol percent catalyst, is used.

The process of the present invention is just as applicable to the production of catalysts for the polymerization of C-alkyl-substituted pyrrolidone, such as 4-methyl-2-pyrrolidone, and copolymers of 2-pyrrolidone, such as with caprolactam, as to the production of catalysts for the polymerization of 2-pyrrolidone. Consequently, in general, and unless otherwise indicated, "monomer" denotes 2-pyrrolidone, substituted 2-pyrrolidone, and any compound capable of copolymerizing with 2-pyrrolidone under the stated conditions of alkaline polymerization catalysis.

In order to produce high-quality poly-2-pyrrolidone capable of being formed into fibers, filaments and yarn of commercial textile quality, it is necessary that the 2-pyrrolidone monomer by of high purity. Depending upon the process of manufacture, commercially available 2-pyrrolidone may contain appreciable amounts of various impurities, some of which are believed to interfere deleteriously with polymerization. Purification of the monomer to polymerization grade is achieved by methods known in the art, for example see U.S. Pat. Nos. 3,721,652 and 3,806,427. All of the experiments reported hereinbelow were performed on 2-pyrrolidone of high purity.

EXEMPLIFICATION

Example 1 illustrates the unsatisfactory yield obtained from sodium metal-derived catalysts in the absence of a step incorporating the improvement of the present invention.

EXAMPLE 1

1.39 g (0.06 mol) of sodium was added to 50 g (0.59 mol) of purified monomer in 5.5 hours at 38°–45° C., but there was no distillation. About 3 mol percent of $CO_2$ based on total monomer was added. 44.58 g of the solution was heated for 22 hours at 50° C., yielding 0.15 g of polymer, which corresponded to only 0.3% conversion of monomer.

Examples 2 and 3 show the substantial improvement in polymerization yield obtainable from sodium metal-derived catalysts by the process of the present invention.

EXAMPLE 2

1.35 g. (0.06 mol) of sodium was added to 60 g (0.71 mol) of purified monomer. The sodium was added in small portions which had been cut up under pentane. The sodium dissolved slowly. After 20 hours of stirring at room temperature, stirring was continued at 40° C. in an oil bath for 4 hours to complete dissolution of the sodium. A fine white precipitate was noted. Approximately 17 weight percent of the solution was distilled off under reduced pressure (pot temperature 105° C., head temperature and pressure 95° C./1–1.5 mm Hg). The residuum was cooled to 30° C. and a calibrated amount of $CO_2$ gas, equivalent to 3 mol percent based on total monomer, was added. 46.02 g of this solution was heated at 50° C. for 22 hours, yielding 5.61 g of polymer, which represented 12% monomer conversion.

EXAMPLE 3

1.38 g (0.06 mol) of sodium was added in small portions to 80 g (0.94 mol) of purified monomer at 40–46° C. (oil bath) over 4.5 hours. Some precipitate was formed. After dissolution, about 39 weight percent of the solution was distilled off under reduced pressure (pot temperature 112° C., head temperature and pressure 104° C./2 mm Hg). The residue was cooled to 30° C. and 3 mol percent (based on total monomer) of $CO_2$ gas was added. 43.36 g of this solution was polymerized for 22 hours at 50° C., yielding 6.72 g of polymer having a viscosity on the Gardner scale of D and corresponding to 16% monomer conversion.

Example 4 illustrates the less satisfactory yield obtained from potassium metal-derived catalyst in the absence of a step incorporating the improvement of the present invention.

EXAMPLE 4

To 50 g (0.59 mol) of purified monomer was added 2.29 g (0.06 mol) of potassium (weighed and cut under pentane) over a period of about 20 minutes. The potassium was dissolved with some gas evolution, forming a colorless, cloudy solution. $CO_2$, 3 mol percent based on monomer, was added and then the solution was polymerized for 22 hours at 50° C. The polymer had a viscosity on the Gardner scale of B and corresponded to 15% monomer conversion.

The following examples show the substantial improvement in polymerization yield over Example 4 obtainable by the process of the present invention.

EXAMPLE 5

60 g of purified monomer and 2.31 g of potassium metal were reacted as in Example 4. This was followed by the vacuum distillation of 16.5% of the solution (pot temperature 113° C., head temperature and pressure 103° C./2 mm Hg). The residuum was cooled to 30° C. and a calibrated amount of $CO_2$ gas (3 mol percent) was added. This solution was heated at 50° C. for 22 hours, yielding polymer having a viscosity on the Gardner scale of J and corresponding to 25% conversion of monomer.

EXAMPLE 6

80 g of purified monomer was reacted as in Example 5 with 2.30 g of potassium metal. Approximately 39 weight percent of the solution was distilled off under reduced pressure (pot temperature 112° C., head temperature and pressure 105° C./1.5 mm Hg). The residuum was cooled to 30° C. and a calibrated amount of $CO_2$ gas (3 mol percent) was added. This solution was polymerized for 22 hours at 50° C., yielding polymer having a viscosity on the Gardner scale of X-Y and corresponding to 43% conversion of monomer.

| Ex. No. | Alkali Metal | % Distilled | % Conversion |
|---|---|---|---|
| 1 | Na | none | 0.3 |
| 2 | Na | 17 | 12 |
| 3 | Na | 39 | 16 |
| 4 | K | none | 15 |
| 5 | K | 16.5 | 25 |
| 6 | K | 39 | 43 |

All polymerizations were carried out for 22 hours at 50° C. Percent conversion is calculated as grams of polymer times (100/total monomer in grams). Percent distilled is expressed as weight percent of total solution. Polymer viscosity is measured at room temperature (about 25° C.) on the Gardner Viscosity Scale using a Gardner-Holdt Bubble Viscometer. 0.5 g of polymer is dissolved in 10 ml of concentrated formic acid (90% by weight HCOOH, 10% water). The polymer solution is compared in viscosity to the Gardner Bubble Standards, e.g., Standard U corresponds to 6.27 stokes, Standard Z corresponds to 22.7 stokes ("Physical and Chemical Examination, Paints, Varnishes, Lacquers and Colors", by H.A. Gardner and G.G. Sward, 12th Ed., 1962, distributed by Gardner Laboratory Company, Inc., Bethesda, Md).

Examination of the results of Examples 1-6 shows that it is possible to make an effective catalyst for the alkaline-catalyzed polymerization of 2-pyrrolidone from an alkali metal in metalic form if the process of the present invention is utilized.

What is claimed is:

1. A process for polymerizing 2-pyrrolidone to a fiber-forming polypyrrolidone which comprises contacting said 2-pyrrolidone with a polymerization activator and a catalyst, prepared by a process comprising the steps of:
   (a) reacting an alkali metal with an excess amount of a 5-7 membered-ring lactam to form a mixture of said lactam and an alkali metal lactamate catalyst; and
   (b) allowing the evolution of hydrogen gas accompanying said reaction to subside and then distilling off about 5-50% by weight of the total lactam, from said mixture thereby yielding a residuum containing about 50-95% by weight of the total lactam.

2. The process of claim 1 wherein said distillation is conducted at pressures of about from atmospheric to sub-atmospheric and temperatures in the range of about 50° to 300° C.

3. The process of polymerizing 2-pyrrolidone according to claim 1 wherein said alkali metal and said lactam are contacted in mol ratio of about 1:2-50.

4. The process of polymerizing 2-pyrrolidone according to claim 1 wherein said alkali metal is sodium or potassium and said lactam is 2-pyrrolidone.

5. The process of polymerizing 2-pyrrolidone according to claim 1 wherein said alkali metal is potassium and said lactam is 2-pyrrolidone.

6. The process of polymerizing 2-pyrrolidone according to claim 1 wherein said alkali metal is sodium or potassium, said lactam is 2-pyrrolidone, and said activator is carbon dioxide present in the amount of 0.02-10 mol percent based on total 2-pyrrolidone.

7. The process of polymerizing 2-pyrrolidone according to claim 1 wherein said alkali metal is sodium or potassium, said lactam is 2-pyrrolidone, and said activator is carbon dioxide or sulfur dioxide present in the amount of 0.02-10 mol percent based on total 2-pyrrolidone.

* * * * *